United States Patent
Okasaka

(10) Patent No.: US 7,570,289 B2
(45) Date of Patent: Aug. 4, 2009

(54) ELECTRONIC CAMERA HAVING A CLAMP CIRCUIT AND PERFORMING A CLAMPING PROCESS ON AN IMAGE SIGNAL

(75) Inventor: Akira Okasaka, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 886 days.

(21) Appl. No.: 11/050,070

(22) Filed: Feb. 3, 2005

(65) Prior Publication Data

US 2005/0206756 A1    Sep. 22, 2005

(30) Foreign Application Priority Data

Mar. 16, 2004   (JP)   ............................. 2004-074028

(51) Int. Cl.
*H04N 9/64* (2006.01)
(52) U.S. Cl. .................... 348/245; 348/362; 348/229.1; 348/234; 348/221.1
(58) Field of Classification Search ................. 348/245, 348/213, 214, 229.1, 234, 221.1, 362–366
See application file for complete search history.

(56) References Cited

U.S. PATENT DOCUMENTS

| 6,163,342 | A * | 12/2000 | Suzuki ........................ 348/364 |
| 6,525,769 | B1 * | 2/2003 | Thomas et al. .............. 348/243 |
| 6,970,193 | B1 * | 11/2005 | Kidono et al. .............. 348/245 |
| 6,982,705 | B2 * | 1/2006 | Kunimi et al. .............. 345/204 |
| 2002/0140844 | A1 * | 10/2002 | Kurokawa et al. .......... 348/362 |
| 2007/0165132 | A1 * | 7/2007 | Okasaka ..................... 348/362 |

FOREIGN PATENT DOCUMENTS

| JP | 2000-278613 | 10/2000 |
| JP | 2003-018468 | 1/2003 |
| JP | 2003-092705 | 3/2003 |
| JP | 2004-222185 | 8/2004 |
| JP | 2005-176115 | 6/2005 |

* cited by examiner

*Primary Examiner*—David L Ometz
*Assistant Examiner*—Usman Khan
(74) *Attorney, Agent, or Firm*—Gerald T. Bodner

(57) ABSTRACT

An electronic camera includes a CCD imager. A first specific evaluation area is assigned to one end in a horizontal direction of an effective area formed on an imaging surface, and a second specific evaluation area is assigned to the other end in a horizontal direction of the effective area. Also, a first clamp area is assigned in an optical black area in vicinity of the first specific evaluation area, and a second clamp area is assigned in an optical black area in vicinity of the second specific evaluation area. A luminance evaluation circuit obtains a first luminance evaluation value with respect to the first specific evaluation area and obtains a second luminance evaluation value with respect to the second specific evaluation area. In addition, a clamp circuit performs a clamping process on a raw image signal taking note of the first clamp area or the second clamp area. A CPU switches the area to be noted for the clamping process between the first clamp area and the second clamp area based on the first luminance evaluation value and the second luminance evaluation value.

3 Claims, 5 Drawing Sheets

ELECTRONIC CAMERA HAVING A CLAMP CIRCUIT AND PERFORMING A CLAMPING PROCESS ON AN IMAGE SIGNAL

BACKGROUND OF THE INVENTION

1. Field of the Invention

The present invention relates to an electronic camera applied to a digital camera, for example. More particularly, the present invention relates to an electronic camera, which clamps a raw image signal output from an image sensor.

2. Description of the Prior Art

One example of such a kind of conventional electronic camera is disclosed in Japanese Patent Laying-open No. 2000-278613 laid-open on Oct. 6, 2000. According to this prior art, an optical black level and a preliminary feeding level (a vacant feeding level) are detected from an image signal output from a CCD imager. A clamp timing is switched between an optimal black period and a preliminary feeding period (a vacant feeding period), depending on a difference between the detected levels. However, there exists a level difference between the preliminary feeding level and the optical black level. In the prior art, therefore, a clamp level fluctuates in response to switching of the clamp timing.

SUMMARY OF THE INVENTION

Therefore, it is a primary object of the present invention to provide a novel electronic camera.

It is another object of the present invention to provide an electronic camera capable of performing a high-precision clamping process.

An electronic camera according to claim 1 comprises: an imager for outputting an image signal generated on an imaging surface having an effective area onto which an optical image of an object scene is irradiated and an optical black area formed around the effective area and to which irradiation of light is restricted; a first evaluator for evaluating a luminance of a first partial image signal which corresponds to a first partial effective area assigned to a first end portion of the effective area, out of the image signal output from the imager; a second evaluator for evaluating a luminance of a second partial image signal which corresponds to a second partial effective area assigned to a second end portion of the effective area, out of the image signal output from the imager; a damper for performing a clamping process on the image signal output from the imager, taking note of one of a first partial black area assigned in the optical black area in vicinity to the first partial effective area and a second partial black area assigned in the optical black area in vicinity of the second partial effective area; and a switcher for switching the area to be noted for the clamping process between the first partial black area and the second partial black area based on a first evaluation value determined by the first evaluator and a second evaluation value determined by the second evaluator.

The imaging surface of the imager has the effective area to which an optical image of an object scene is irradiated and the optical black area formed around the effective area and to which the irradiation of light is restricted. The imager outputs the image signal generated on the imaging surface.

The first partial effective area is assigned to the first end portion of the effective area and the second partial effective area is assigned to the second end portion of the effective area. Also, the first partial black area is assigned in the optical black area in vicinity of the first partial effective area, and the second partial black area is assigned in the optical black area in vicinity of the second partial effective area.

The first evaluator evaluates the luminance of the first partial image signal which corresponds to the first partial effective area, out of the image signal output from the imager. The second evaluator evaluates the luminance of the second partial image signal which corresponds to the second partial effective area, out of the image signal output from the imager. In addition, the damper performs the clamping process on the image signal output from the imager, taking note of either the first partial black area or the second partial black area.

The switcher switches the area to be noted for the clamping process between the first partial black area and the second partial black area based on the first evaluation value determined by the first evaluator and the second evaluation value determined by the second evaluator.

As stated above, the first partial black area and the second partial black area are assigned to the vicinities of the first partial effective area and second partial effective area, respectively. Which to be noted, the first partial black area or the second partial black area, is determined on basis of the luminances of the first partial effective area and second partial effective area.

This makes it possible to perform the clamping process taking note of the second partial black area if blooming may occur in the first partial black area due to the irradiation of a large amount of light to the first partial effective area, and makes it possible to perform the clamping process taking note of the first partial black area if blooming may occur in the second partial black area due to the irradiation of a large amount of light into the second partial effective area. As a result, the high-precision clamping process is achieved.

An electronic camera according to claim 2 depends on claim 1. The switcher includes a first selector for selecting the second partial black area when the first luminance evaluation value exceeds a first threshold value, and a second selector for selecting the first partial black area when the second luminance evaluation value exceeds a second threshold value.

An electronic camera according to claim 3 depends on claim 1. The imager outputs the image signal in a raster-scanning manner. The first partial effective area and the second partial effective area are formed on one end and the other end in a horizontal direction, respectively.

An electronic camera according to claim 4 depends on claim 1 and further comprises an adjuster for adjusting an exposure amount of the imager based on a third partial image signal which corresponds to a third partial effective area assigned to a center of the effective area, out of the image signal having been subjected to the clamping process.

It takes some time between the irradiation of a large amount of light to the first partial effective area (the second partial effective area) and the occurrence of blooming in the first partial black area (the second partial black area). Thus, at an instant when the blooming occurs in the first partial black area (the second partial black area), the area to be noted is switched from the first partial black area (the second partial black area) to the second partial black area (the first partial black area). As a result, the clamping process is properly performed and the amount of light exposure is accurately adjusted.

The above described objects and other objects, features, aspects and advantages of the present invention will become

DETAILED DESCRIPTION OF THE PREFERRED EMBODIMENTS

Figure 1:
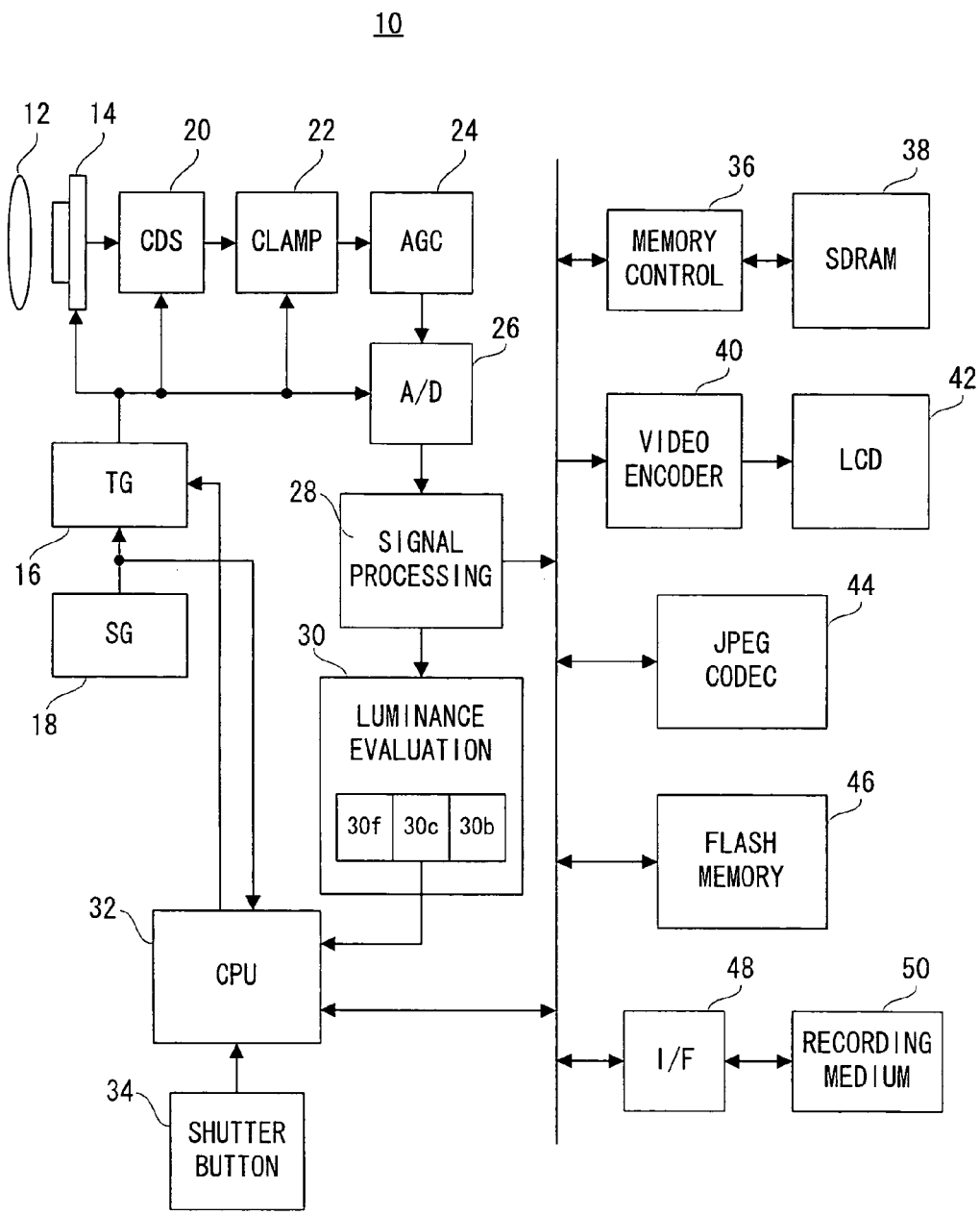
FIG. 1 is a block diagram showing one embodiment of the present invention.
Figure 2:
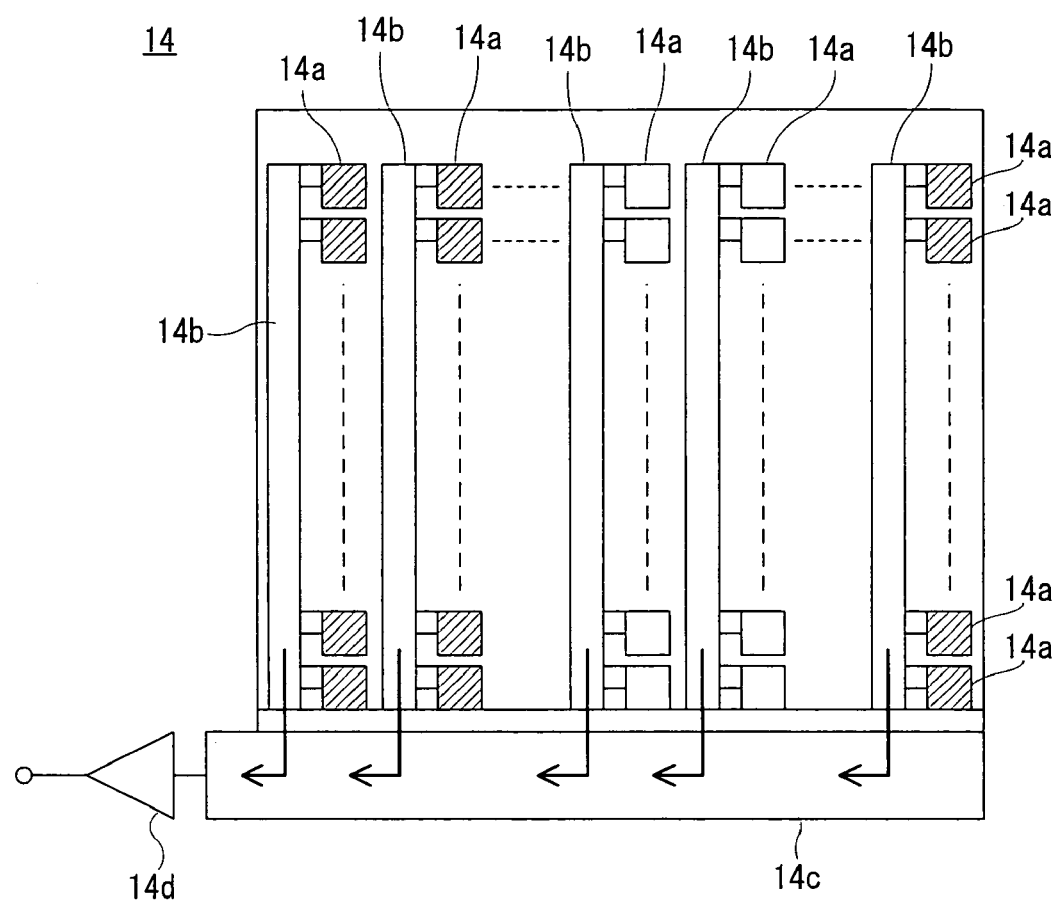
FIG. 2 is an illustrative view showing one example of structure of a CCD imager applied to the FIG. 1 embodiment.

Referring to FIG. 1, a digital camera 10 of this embodiment includes an optical lens 12. An optical image of an object scene is irradiated in an upside-down state through the optical lens 12 onto an imaging surface of a CCD imager 14. A plurality of photoreceptors 14a, 4a, . . . are formed on the imaging surface as shown in FIG. 2. The photoreceptors 14a, 4a, . . . generates electric charges corresponding to the optical image by photoelectronic conversion. Additionally, the imaging surface is covered with a primary color filter (not illustrated) having a Bayer pattern, and an amount of the electric charge generated by each photoreceptor 14a reflects a light amount of R, G or B.

When power is turned on, a CPU 32 instructs a TG (Timing Generator) 16 to repeat pre-exposure and thinning-out reading for execution of through image processing. The TG 16 subjects the CCD imager 14 to the pre-exposure every 1/30 second based on a vertical synchronizing signal Vsync and a horizontal synchronizing signal Hsync output from an SG (Signal Generator) 18, and reads out electric charges generated by each pre-exposure, from the CCD imager 14 in a thinning-out manner.

Due to the thinning-out manner, the electric charges generated by some of the photoreceptors 14a, 14a, . . . shown in FIG. 2 are read into vertical transfer registers 14b, 14b, . . . The read electric charges are transferred in a vertical direction by the vertical transfer registers 14b, 14b, . . . and then transferred in a horizontal direction by a horizontal transfer register 14c. The horizontally transferred electric charges are output outside from an output circuit 14d. Thus, the imaging surface is subjected to a raster-scanning operation and the electric charges are output one line by one line.

Figure 3:
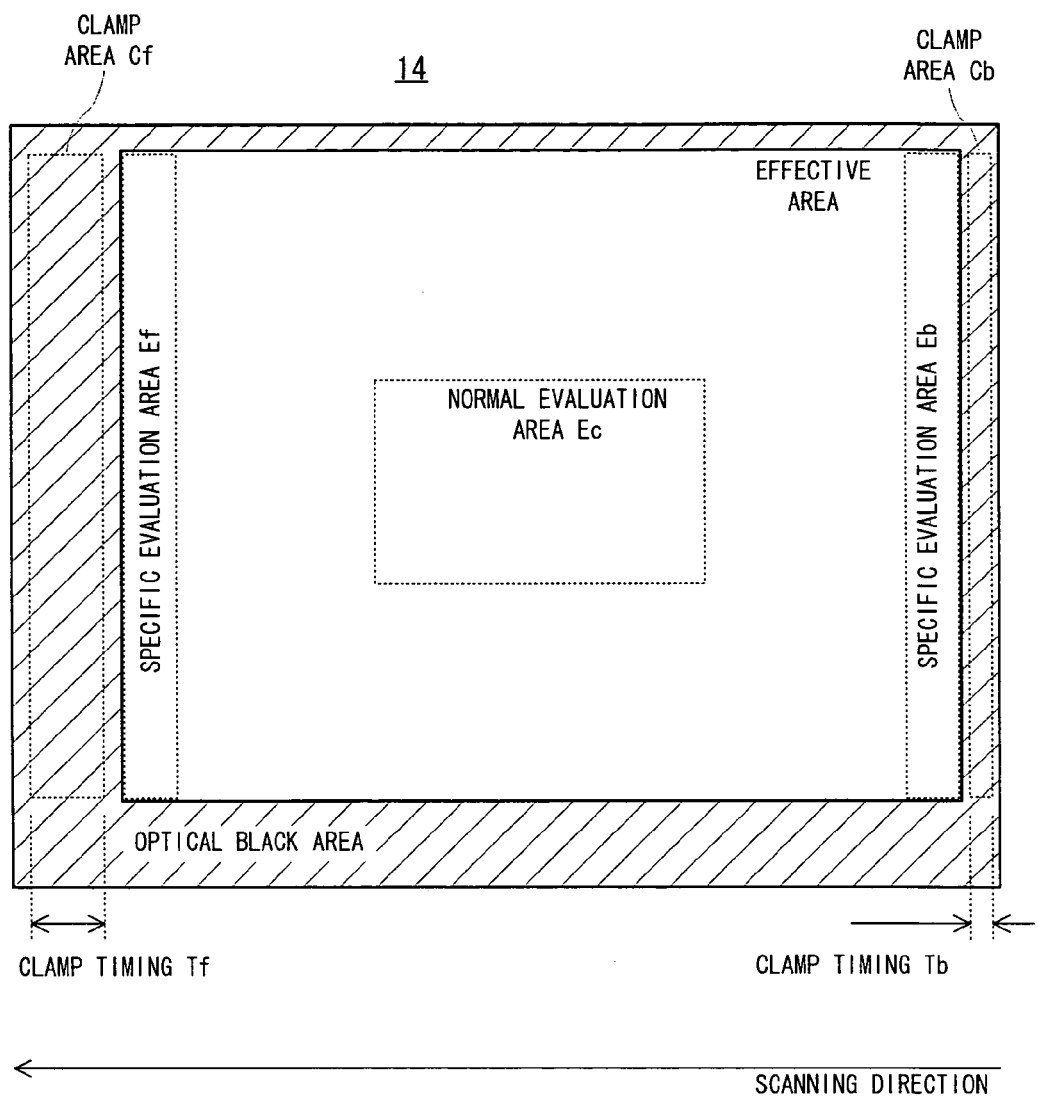
FIG. 3 is an illustrative view showing one part of an operation of the CCD imager applied to the FIG. 1 embodiment.

The electric charges output from the CCD imager 14, i.e. a raw image signal having a low resolution, are subjected to a noise removal process by a CDS (Correlation Double Sampling) circuit 20. A clamp circuit 22 performs a clamping process on the noise-removed raw image signal. As shown in FIG. 3, clamp areas Cf and Cb are formed in an optical black area of the imaging surface. The clamp area Cf is located at a leading edge of the imaging surface, and the clamp area Cb is located at a trailing edge of the imaging surface. The clamp circuit 22 performs the clamping process taking note of the clamp area Cf when a clamp pulse, which becomes active at a clamp timing Tf, is output from the TG 16, and performs the clamping process taking note of the clamp area Cb when a clamp pulse, which becomes active at a clamp timing Tb, is output from the TG 16. This makes it possible to match a pedestal level of the raw image signal with an optical black level.

The clamped raw image signal is subjected to a gain adjusting process by an AGC (Automatic Gain Control) circuit 24, and then converted by an A/D converter 26 into raw image data as a digital signal. A signal processing circuit 28 performs such signal processes as white balance adjustment, YUV conversion, etc. on the raw image data output from the A/D converter 26, and write the image data of YUV format into an SDRAM 38 through a memory control circuit 36.

A video encoder 40 reads each frame of the image data from the SDRAM 38 through the memory control circuit 36, and converts the read image data into a composite video signal of NTSC format. The converted composite video signal is supplied to an LCD monitor 42, and therefore, a real-time moving image (through image) of the object scene is displayed on a monitor screen.

Out of the image data generated by the signal processing circuit 28, Y data is also supplied to a luminance evaluation circuit 30. The luminance evaluation circuit 30 integrates the supplied Y data every one-frame period (1/30 second) to calculate a luminance evaluation value for each frame.

Referring to FIG. 3, a normal evaluation area Ec is assigned to the center of the effective area formed on the imaging surface. Also, a specific evaluation area Ef is assigned to a vicinity of the clamp area Cf of the effective area, and a specific evaluation area Eb is assigned to the clamp area Cb of the effective area. The luminance evaluation circuit 30 obtains a luminance evaluation value Iyc by integrating the Y data corresponding to the normal evaluation area Ec every one-frame period, obtains a luminance evaluation value Iyf by integrating the Y data corresponding to the normal evaluation area Ef every one-frame period, and obtains a luminance evaluation value Iyb by integrating the Y data corresponding to the normal evaluation area Eb every one-frame period.

Additionally, the luminance evaluation circuit 30 is provided with integrators 30c, 30f and 30b. The integrator 30c calculates the luminance evaluation value Iyc, the integrator 30f calculates the luminance evaluation value Iyf, and the integrator 30b calculates the luminance evaluation value Iyb.

Out of the obtained luminance evaluation values Iyc, Iyf and Iyb, the luminance evaluation value Iyc is used for an AE process for through image which is executed by the CPU 32. The CPU 32 fetches the luminance evaluation value Iyc from the luminance evaluation circuit 30 in response to the vertical synchronizing signal Vsync, calculates an optimal exposure period based on the fetched luminance evaluation value Iyc, and sets the calculated optimal exposure period to the TG 16. The TG 16 performs a pre-exposure according to the set optimal exposure period. Consequently, the brightness of the through image displayed on the LCD monitor 42 is appropriately adjusted.

When a shutter button 34 is half depressed, an AE process for recorded image is performed by the CPU 32. As a consequence, an optimal exposure period for main exposure is obtained. The obtained optimal exposure period is set to the TG 16.

When the shutter button 34 is fully depressed, a photographing/recording process is performed by the CPU 32. The CPU 32 firstly instructs the TG 16 to perform main exposure and all-pixel reading, and instructs a driver (not illustrated) to drive a mechanical shutter (not illustrated) at an instant when the optimal exposure period has elapsed from a start of the main exposure.

The TG 16 subjects the CCD imager 14 to the main exposure, and the mechanical shutter interrupts the light being irradiated onto the image sensor 14 at a desired timing. The TG 16 reads all electric charges generated by the main exposure in a raster-scanning manner after the driving of the mechanical shutter. The read electric charges, i.e., a raw image signal having a high resolution, are processed in a manner similar to the above described one, and consequently the image data of the high resolution is written into the SDRAM 38.

The CPU 32 then instructs a JPEG codec 44 to perform JPEG-compression. The JPEG codec 44 reads the image data of the high resolution stored in the SDRAM 38 through the memory control circuit 36, compresses the read image data in a JPEG format, and then writes the compressed image data, i.e., the JPEG data, into the SDRAM 38 through the memory control circuit 36.

After that, the CPU 32 reads the JPEG data from the SDRAM 38 through the memory control circuit 36, and records a JPEG file containing the read JPEG data on a recording medium through an I/F 48.

Figure 4:
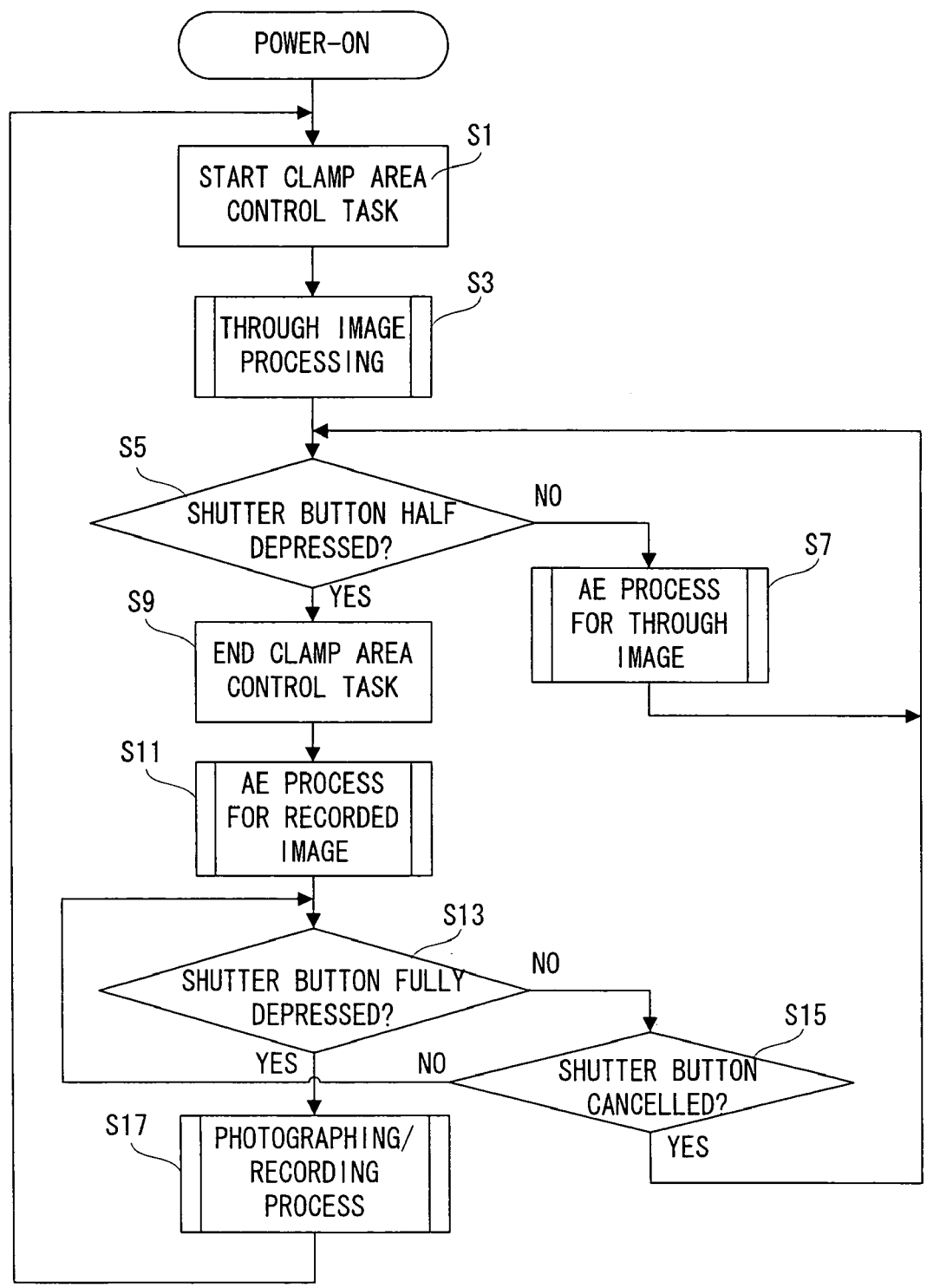
FIG. 4 is a flowchart showing one part of an operation of a CPU applied to the FIG. 1 embodiment.
Figure 5:
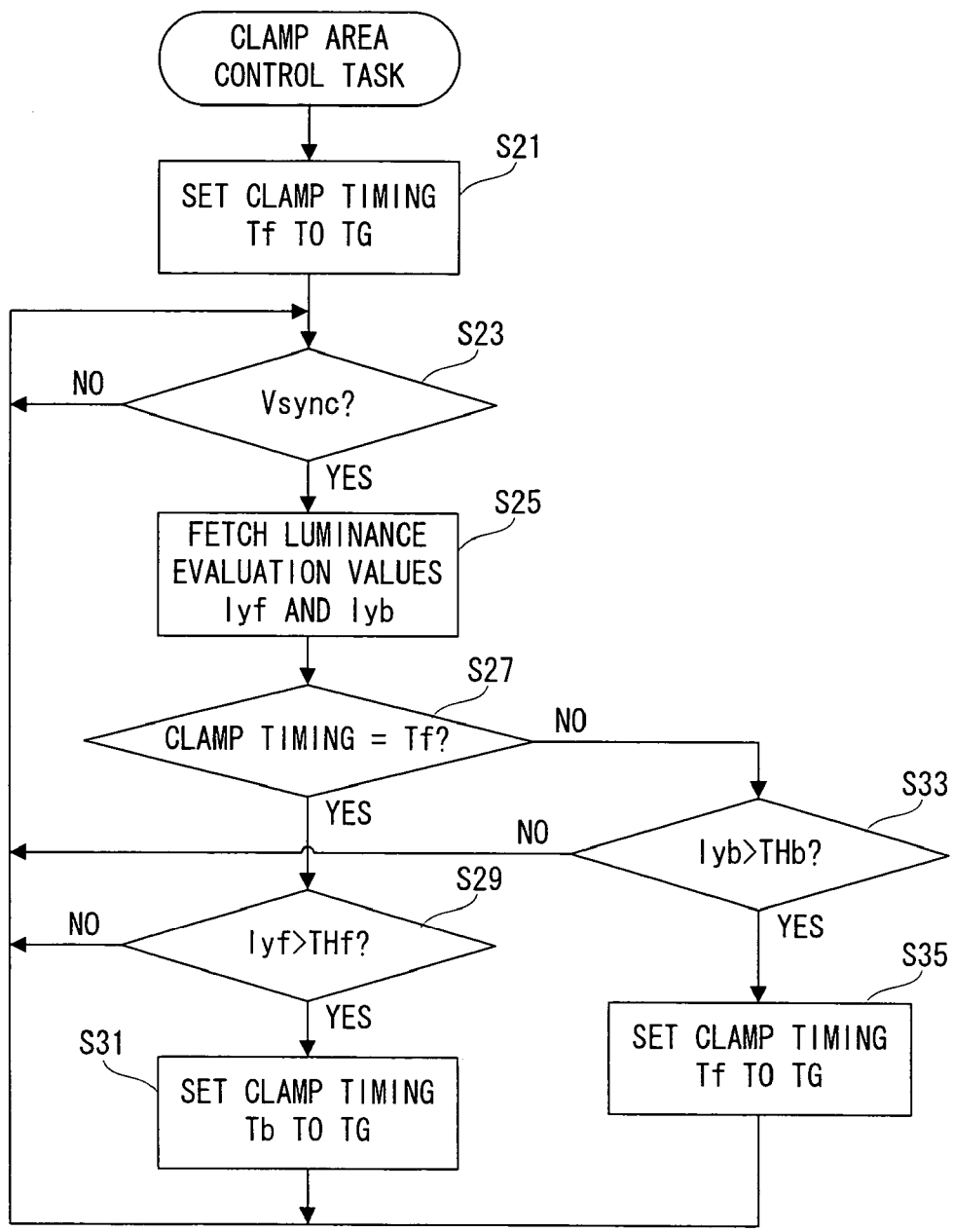
FIG. 5 is a flowchart showing another part of the operation of the CPU applied to the FIG. 1 embodiment.

The CPU 32 is a multi-tasking CPU which carries out a multi-tasking OS such as the μITON, and performs in parallel a main task shown in FIG. 4 and a clamp area control task shown in FIG. 5. It is noted that the multi-tasking OS and a control program corresponding to the tasks shown in FIG. 4 and FIG. 5 are stored in a flash memory 46.

Referring to FIG. 4, the clamp area control task is started in a step S1 and the through image processing is performed in a step S3. By the process in the step S3, the through image is output from the LCD monitor 42.

In a step S5, it is determined whether or not the shutter button 34 is half depressed. If "NO", the AE process for through image is performed in a step S7 and then the process is returned to the step S5. The pre-exposure period is adjusted by the process in the step S7, and thus the brightness of the through image displayed on the LCD monitor 42 is appropriately adjusted.

When the shutter button 34 is half depressed, the clamp area control task is ended in a step S9, and the AE process for recorded image is performed in a step S11. By the process in the step S11, the optimal exposure period for main exposure is obtained.

In a step S13, it is determined whether or not the shutter button 34 is fully depressed, and, in a step S15, it is determined whether or not an operation of the shutter button 34 is cancelled. When the operation of the shutter button 34 is cancelled, YES is determined in the step S15 and the process is returned to the step S5.

When the shutter button 34 is fully depressed, YES is determined in the step S13 and the photographing/recording process is performed in the step S17. By the process in the step S17, the image data based on the main exposure is recorded in a compressed state on the recording medium 50. When the process in the step S17 is completed, the process is returned to the step S1.

Referring to FIG. 5, the clamp timing Tf is set to the TG 16 in a step S21. The TG 16 generates a clamp pulse which becomes active at the clamp timing Tf shown in FIG. 3. The pedestal level of the raw image signal is matched with the level of the clamp area Cf.

In a step S23, it is determined whether or not the vertical synchronizing signal Vsync is output from the SG 18. If YES, the luminance evaluation values Iyf and Iyb are fetched from the luminance evaluation circuit 30 in a step S25. In a step S27, the clamp timing currently set to the TG 18 is identified.

If the set clamp timing is "Tf", the process is advanced to a step S29 to compare the fetched luminance evaluation value Iyf with a threshold value THf. Then, if Iyf≦THf, it is determined that no blooming will occur in the clamp area Cf, and the process is returned to the step S23. On the contrary, if Iyf>THf, it is determined that some blooming will occur in the clamp area Cf, the clamp timing Tb is set to the TG 16 in a step S31, and then the process is returned to the step S23.

By the process in the step S31, the TG 16 generates a clamp pulse which becomes active at the clamp timing Tb shown in FIG. 3. The pedestal level of the raw image signal is matched with the level of the clamp area Cb.

If NO is determined in the step S27, the luminance evaluation value Iyb is compared with the threshold value THb in a step S33. Then, if Iyb≦THb, it is determined that no blooming will occur in the clamp area Cb, and the process is returned to the step S23. On the contrary, if Iyb>THb, it is determined that some blooming will occur in the clamp area Cb, the clamp timing Tf is set to the TG 16 in a step S35, and the process is returned to the step S23.

By the process in the step S23, the pedestal level of the raw image signal is matched with the level of the clamp area Cf.

As understood from the above description, the imaging surface of the CCD imager 14 has the effective area onto which an optical image of an object scene is irradiated and the optical black area which is formed around the effective area and to which the irradiation of light is restricted. The CCD imager 14 outputs a raw image signal by raster-scanning the imaging surface.

The specific evaluation area Ef is assigned to one end of the effective area in the horizontal direction, and the specific evaluation area Eb is assigned to the other end of the effective area in the horizontal direction. Also, the clamp area Cf is assigned to the vicinity of the specific evaluation area Ef in the optical black area, and the clamp area Cb is assigned to the vicinity of the specific evaluation area Eb in the optical black area.

The integrator 30f provided with the luminance evaluation circuit 30 obtains the luminance evaluation value Iyf with respect to the specific evaluation area Ef, and the integrator 30b provided with the same luminance evaluation circuit 30 obtains the luminance evaluation value Iyb with respect to the specific evaluation area Eb. Also, the clamp circuit 22 performs the clamping process on the raw image signal output from the CDS circuit 20, taking note of any one of the clamp areas Cf and Cb. The CPU 32 switches the area to be noted for the clamping process between the clamp areas Cf and Cb based on the luminance evaluation values Iyf and Iyb.

Thus, the clamp areas Cf and Cb are assigned to the vicinities of the specific evaluation areas Ef and Eb, respectively. Which to be noted, the clamp areas Cf or Cb, is determined on the basis of the luminance evaluation values Iyf and Iyb.

This makes it possible to perform the clamping process taking note of the clamp area Cb when some blooming may occur in the clamp area Cf due to the irradiation of a large amount of light into the specific evaluation area Ef, and makes it possible to perform the clamping process taking note of the clamp area Cf when some blooming may occur in the clamp area Cb due to the irradiation of a large amount of light into the specific evaluation area Eb. As a consequence, the high-precision clamping process is achieved.

Moreover, the normal evaluation area Ec is assigned to the center of the effective area. The integrator 30c provided with the luminance evaluation circuit 30 obtains the luminance evaluation value Iyc with respect to the normal evaluation area Ec. The CPU 32 adjusts an exposure amount based on the luminance evaluation value Iyc.

It requires some time from the irradiation of a large amount of light into the specific evaluation area Ef (or Eb) to the occurrence of blooming in the clamp area Cf (or Cb). Therefore, at the instant when some blooming occurs in the clamp area Cf (or Cb), the area to be noted is switched from the clamp area Cf (or Cb) to the clamp area Cb (or Cf). As a result, the clamping process is properly performed and the exposure amount is accurately adjusted.

It is noted that, although the object scene is photographed by the CCD imager in this embodiment, a CMOS imager may be adopted in place of the CCD imager.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera comprising:
    an imager for outputting an image signal generated on an imaging surface having an effective area onto which an optical image of an object scene is irradiated and an optical black area formed around said effective area and to which irradiation of light is restricted;
    a first evaluator for evaluating a luminance of a first partial image signal which corresponds to a first partial effective area assigned to a first end portion of said effective area, out of the image signal output from said imager;
    a second evaluator for evaluating a luminance of a second partial image signal which corresponds to a second partial effective area assigned to a second end portion of said effective area, out of the image signal output from said imager;
    a clamper for performing a clamping process on the image signal output from said imager, taking note of one of a first partial black area assigned in said optical black area in vicinity of said first partial effective area and a second partial black area assigned in said optical black area in vicinity of said second partial effective area; and
    a switcher for switching the area to be noted for the clamping process between said first partial black area and said second partial black area based on a first evaluation value determined by said first evaluator and a second evaluation value determined by said second evaluator;
    wherein said switcher includes a first selector for selecting said second partial black area when the first luminance evaluation value exceeds a first threshold value, and a second selector for selecting said first partial black area when the second luminance evaluation value exceeds a second threshold value.

2. An electronic camera comprising:
    an imager for outputting an image signal generated on an imaging surface having an effective area onto which an optical image of an object scene is irradiated and an optical black area formed around said effective area and to which irradiation of light is restricted;
    a first evaluator for evaluating a luminance of a first partial image signal which corresponds to a first partial effective area assigned to a first end portion of said effective area, out of the image signal output from said imager;
    a second evaluator for evaluating a luminance of a second partial image signal which corresponds to a second partial effective area assigned to a second end portion of said effective area, out of the image signal output from said imager;
    a clamper for performing a clamping process on the image signal output from said imager, taking note of one of a first partial black area assigned in said optical black area in vicinity of said first partial effective area and a second partial black area assigned in said optical black area in vicinity of said second partial effective area;
    a switcher for switching the area to be noted for the clamping process between said first partial black area and said second partial black area based on a first evaluation value determined by said first evaluator and a second evaluation value determined by said second evaluator; and
    an adjuster for adjusting an exposure amount of said imager based on a third partial image signal which corresponds to a third partial effective area assigned to a center of said effective area, out of the image signal having been subjected to the clamping process.

3. A clamp control method for an electronic camera comprising the steps of:
    (a) outputting an image signal generated on an imaging surface having an effective area onto which an optical image of an object scene is irradiated and an optical black area formed around said effective area and to which irradiation of light is restricted;
    (b) evaluating a luminance of a first partial image signal which corresponds to a first partial effective area assigned to a first end portion of said effective area, out of the image signal output in said step (a);
    (c) evaluating a luminance of a second partial image signal which corresponds to a second partial effective area assigned to a second end portion of said effective area, out of the image signal output in said step (a);
    (d) performing a clamping process on the image signal output from said imager, taking note of one of a first partial black area assigned in said optical black area in vicinity of said first partial effective area and a second partial black area assigned in said optical black area in vicinity to said second partial effective area; and
    (e) switching the area to be noted for the clamping process performed in said step (d) between said first partial black area and said second partial black area based on a first luminance evaluation value determined in said step (b) and a second luminance evaluation value determined in said step (c);
    wherein the step (e) includes the step of:
    (f) selecting said second partial black area when the first luminance evaluation value exceeds a first threshold value, and selecting said first partial black area when the second luminance evaluation value exceeds a second threshold value.

* * * * *